(12) United States Patent
Green

(10) Patent No.: US 6,523,747 B1
(45) Date of Patent: Feb. 25, 2003

(54) APPARATUS FOR READING PERMANENTLY STRUCTURED MAGNETIC RECORDS

(75) Inventor: Ian Macdonald Green, London (GB)

(73) Assignee: Central Research Laboratories Limited, Hayes (GB)

( * ) Notice: Subject to any disclaimer, the term of this patent is extended or adjusted under 35 U.S.C. 154(b) by 0 days.

(21) Appl. No.: 09/403,528

(22) PCT Filed: Apr. 3, 1998

(86) PCT No.: PCT/GB98/00993
§ 371 (c)(1),
(2), (4) Date: Jan. 27, 2000

(87) PCT Pub. No.: WO98/48369
PCT Pub. Date: Oct. 29, 1998

(30) Foreign Application Priority Data

Apr. 22, 1997 (GB) ............................................. 9708125

(51) Int. Cl.[7] .................................................. G06K 7/08
(52) U.S. Cl. ........................ 235/449; 235/493; 235/492; 235/451; 360/64; 360/77; 360/60
(58) Field of Search ................................ 235/493, 449, 235/492, 451

(56) References Cited

U.S. PATENT DOCUMENTS

| | | | | |
|---|---|---|---|---|
| 3,619,570 A | * | 11/1971 | Grosbard | 235/61.11 D |
| 3,645,392 A | * | 2/1972 | Chittenden et al. | 209/74 |
| 3,956,769 A | * | 5/1976 | Beecroft et al. | 360/77.11 |
| 4,899,037 A | * | 2/1990 | Marechal et al. | 235/493 |
| 4,980,782 A | * | 12/1990 | Ginkel | 360/60 |
| 5,196,681 A | * | 3/1993 | Mantegazza | 235/449 |
| 5,480,685 A | * | 1/1996 | Suzuki et al. | 235/493 X |
| 5,867,639 A | * | 2/1999 | Tuilier et al. | 395/182.04 |
| 5,920,055 A | * | 7/1999 | Roth et al. | 235/380 |
| 5,972,438 A | * | 10/1999 | Suzuki et al. | 427/548 |
| 6,053,406 A | * | 4/2000 | Litman | 235/449 |
| 6,064,276 A | * | 5/2000 | Hallatt et al. | 331/96 |
| 6,073,845 A | * | 6/2000 | Kawase | 235/449 |
| 6,169,461 B1 | * | 2/2001 | Andoh et al. | 331/117 D |
| 6,189,791 B1 | * | 2/2001 | Takita et al. | 235/449 |

FOREIGN PATENT DOCUMENTS

| | | | |
|---|---|---|---|
| GB | 2035659 A | * | 5/1992 |
| GB | WO-9402943 | * | 3/1994 |

* cited by examiner

Primary Examiner—Michael G. Lee
Assistant Examiner—Daniel Walsh
(74) Attorney, Agent, or Firm—William H. Bollman

(57) ABSTRACT

An apparatus for reading permanently structured magnetic records having a first coercivity, comprising an oscillator having an inductive read head that is coupled to a circuit arrangement. At least one side of the read head sees an impedance that is larger than the impedance of the read head over the range of frequencies of interest, such that the read head provides an electrical signal in response to magnetic records having a second coercivity that is higher than the first coercivity (typically 2,000 to 5,000 oersteds). The electrical signal is derived from the voltage across the read head, which is preferably detected by a differential integrator that subtracts the voltages on either side of the read head to give a voltage difference, and integrates this difference over time.

7 Claims, 2 Drawing Sheets

6,523,747 B1

APPARATUS FOR READING PERMANENTLY STRUCTURED MAGNETIC RECORDS

BACKGROUND OF THE INVENTION

1. Field of the Invention

This invention relates to apparatus for reading permanently structured magnetic records having a first coercivity, comprising an oscillator having an inductive read head which is coupled to a circuit arrangement.

2. Description of Related Art

A known apparatus of this type is described in GB-A-2035659. This apparatus can read data from specially constructed magnetic tape consisting of aligned regions of acicular magnetic particles having a coercivity of the order of 300 oersteds (i.e. 24 kA/m). This magnetic tape is known by the trademark "WATERMARK".

"Watermark" tape, being made from "soft" magnetic material, can have non permanent data recorded on it in addition to this permanent structure. One of the features of the active head circuit described in GB-A-2035659 is that it erases any "soft" data which might have been recorded on the tape. This feature is useful to prevent fraud using non-permanent recorded data. The acicular magnetic particles used in this tape are made from low coercivity (LoCo) material.

In recent years there has been a growth in the use of high coercivity (HiCo) magnetic records, for example as tape on credit or bank cards or other documents of value. Such material typically has a coercivity of above about 1200 oersteds (i.e. 100 kA/m) and is described more fully in the standards document ISO 7811/6. The known read head described in GB-A-2035659 does not have a powerful enough magnetic field to erase data recorded on such high coercivity tape. However, the inventor has found that such high coercivity tape cannot be used fraudulently to counterfeit "Watermark" tape as the known read apparatus does not respond to erasable data on high coercivity magnetic tape. Although this is an advantage for the security of "Watermark" tape systems, it is a disadvantage for a general purpose magnetic reader apparatus because two different read heads or two separate read operations would be required if it was desired to read both types of data using the same apparatus.

BRIEF SUMMARY OF THE INVENTION

According to the present invention there is provided apparatus for reading permanently structured magnetic records having a first coercivity, comprising an oscillator having an inductive read head which is coupled to a circuit arrangement, characterised in that at least one side of the read head sees an impedance which is larger than the impedance of the read head over the range of frequencies of interest such that the read head provides an electrical signal in response to magnetic records having a second coercivity which is higher than the first coercivity. This apparatus enables a single read head to be used to read both "Watermark" data and high coercivity data. The high coercivity data may be permanently structured or erasable.

Preferably, the electrical signal is derived from the voltage across the read head. This voltage is advantageously captured by a differential integrator which subtracts the voltages on either side of the read head to give a voltage difference, and integrates this difference over time.

The range of frequencies of interest is conveniently lower than the frequency of operation of the oscillator. Preferably lower than 10 kHz, very preferably lower than 5 kHz.

The invention relates particularly, though not exclusively, to high security magnetic data reader systems.

BRIEF DESCRIPTION OF THE DRAWINGS

Embodiments of the invention will now be described, by way of example only, with reference to the accompanying diagrammatic drawings, in which.

DETAILED DESCRIPTION OF THE INVENTION

Figure 1:
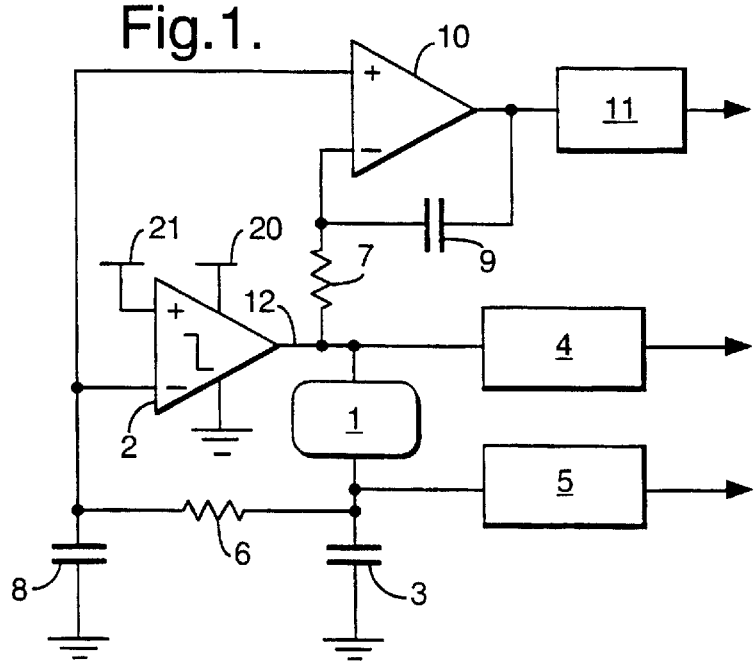
FIG. 1 shows a block diagram of a first embodiment according to the invention.

FIG. 1 shows a conventional "Watermark" tape read head 1 in an active oscillator including a comparator 2 and a resonant circuit comprising the read head and a capacitor 3. The frequency of operation of the oscillator in watermark tape reading apparatus is typically 33 kHz, although higher or lower frequencies can be used if desired. The part of the circuit acting as an oscillator is shown separately in FIG. 2 for clarity.

The apparatus also includes a frequency discrimination circuit 4 to obtain one or more signals associated with the frequency of the watermark data signal, and a peak detection circuit 5 to obtain one or more signals associated with the amplitude of the watermark data signal. The frequency and amplitude detection circuits are substantially as described in GB-A-2035659 or WO 94/02943 and so will not be described in detail here.

A supply voltage (typically 8 volts) is supplied to terminal 20 of the comparator, and a voltage of 4 volts to terminal 21. In the example shown in FIG. 1 the resistors 6 and 7 both have the value 47 kΩ, while capacitors 3, 8 and 9 all have the value 4.7 nF. In operation, the resonant voltage across capacitor 3 is about 60 volts peak to peak at a frequency of 33 kHz. The signal produced by reading data from a HiCo tape will typically be 10 millivolts peak to peak at a frequency of 1–3 kHz. The actual value of the frequency from the data on the HiCo tape will depend upon the speed at which the tape is fed past the head and the density of the recorded data. Typical data densities are of the order of 75 binary digits per inch or 3 binary digits per millimetre. Because the signal from the HiCo tape is small the oscillator part of the circuit should be designed to have low inherent noise. A low pass filter 11 is employed to attenuate the 33 kHz signal in the HiCo signal detection part of the circuit arrangement. In the present example it is a 4 pole Butterworth type having a 5 kHz cut-off point which enables a HiCo signal having a frequency of 1.5 kHz to be passed together with its second and third harmonic whilst still providing significant attenuation at 33 kHz. If higher HiCo data densities and/or higher swipe speeds are required (giving a HiCo signal frequency greater than in the above example) it may be desirable to use an oscillator frequency of greater than 33 kHz to enable good detection of the HiCo signal and good attenuation of the oscillator frequency.

Figure 3:
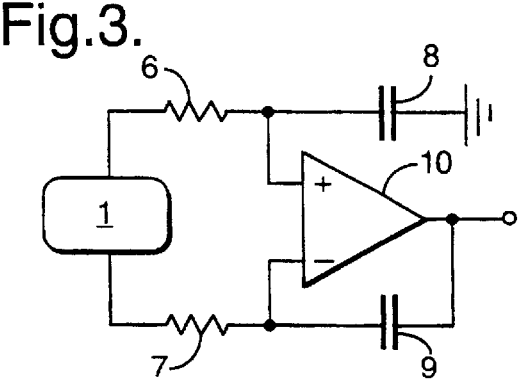
FIG. 3 shows a further part of the circuit of FIG. 1.

The signal from the HiCo tape is amplified by amplifier 10, which is part of the detection part of the circuit. This part of the circuit is shown separately in FIG. 3 for clarity. In FIG. 3 the topography has been redrawn to make it more clear that this part of the circuit operates as a differential integrator in the present embodiment.

Figure 2:
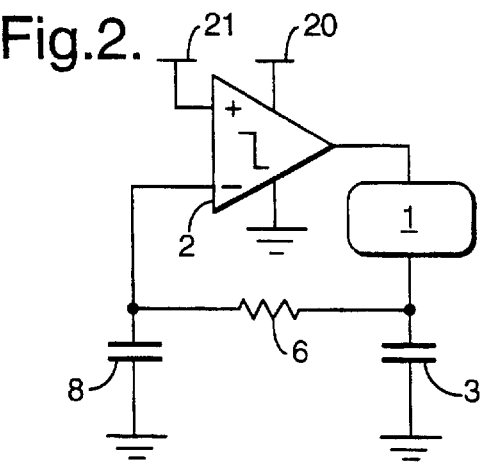
FIG. 2 shows a part of the circuit of FIG. 1.

In operation, the oscillator part of the circuit arrangement shown in FIG. 2 drives a square wave voltage into the resonant circuit consisting of the inductive read head 1 and the capacitor 3. The comparator 2 has a low output impedance. At resonance, the voltage across 3 lags the drive voltage from 2 by 90°. The combination of the capacitor 3 and the resistor 6 provide a further 90° phase lag. The inversion through the comparator provides the final 180° phase shift to bring the total to 360° as required for stable oscillation.

Resistor 6 also provides low frequency negative feedback from output to input of the comparator, which stabilises when the average input voltage is half the supply voltage (i.e. 4 volts in the present example), thus ensuring that the signal from the oscillator has a 1:1 mark to space ratio.

When a signal from a HiCo tape is initially picked up by the head it appears across the capacitor 3 which has a high impedance at low frequencies. Subsequently, the low frequency feedback mentioned above modifies the mark to space ratio in such a way that the HiCo signal appears more strongly at the output of the comparator 2 (point 12 in FIG. 1), in spite of that being a low impedance point. With the short feedback time constant of the oscillator circuit in FIG. 2, the best single point to pick up HiCo signals is the output of the comparator 2. This would be the preferred site to locate a signal detection means.

In a preferred embodiment, the voltage across the read head is detected as illustrated in FIG. 3. This arrangement of components is known to be a differential integrator which subtracts the voltages from terminals on either side of the read head and integrates the difference over time.

The integrator will saturate after a given time. To remedy this, a large capacitor should be added in series with resistor 7 and a large resistor in parallel with capacitor 9. These two components have been omitted from FIG. 1 to improve clarity.

Note that resistor 6 and capacitor 8 which form part of the integrator of FIG. 3 are the same components which form part of the oscillator of FIG. 2. Thus in the preferred embodiment of FIG. 1 they have a dual function.

The detected signal amplitude and frequency from the read head described above are both proportional to the swipe speed. The integrator of FIG. 3, whose amplitude response is inversely proportional to frequency compensates for this, giving an output amplitude which is independent of swipe speed, thus making it easier to discriminate against the Watermark (33 kHz) component over a wide range of swipe speeds.

The integrator and low pass filter described typically improve the ratio of HiCo to Watermark signals by 95 dB.

For successful detection of the data signal from HiCo materials it is necessary that the high impedance on one side of the read head is sufficiently high that the voltage appearing across the terminals of the read head is not degraded in operation so that it cannot be detected by the signal detection means. The impedance in practical systems is likely to be at least two or three times that of the read head, preferably greater than 5 times the impedance of the read head. If the impedance is low the signal will be attenuated and probably distorted.

Figure 4:
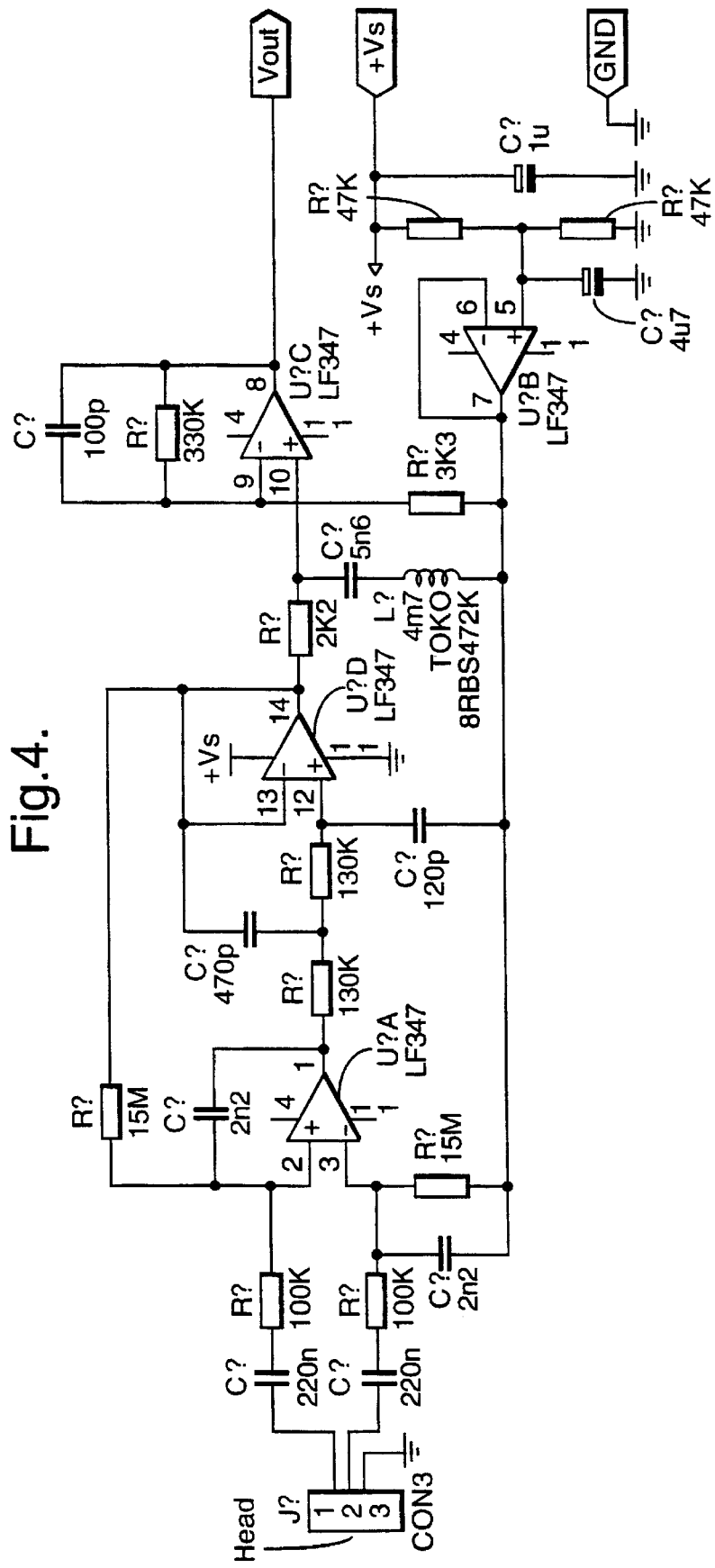
FIG. 4 shows a part of a second embodiment of the invention.

A second embodiment of the invention (having different component values) is shown in the circuit diagram of FIG. 4. In this embodiment the impedance seen by both sides of the read head is larger than the impedance of the inductive head in the frequancy range of interest. The part of the circuit shown in FIG. 4 corresponds to that part of the first embodiment shown in FIG. 3.

What is claimed is:

1. Apparatus for reading magnetic records, comprising:
   an oscillator having a single inductive read head to read permanently structured magnetic records having a first coercivity; and
   an impedance seen by at least one side of said inductive read head being larger than an impedance of said inductive read head over a range of frequencies of interest,
   wherein said single inductive read head provides an electrical signal in response to a magnetic record having a second coercivity greater than 12000 oersteds or 100 kA/m higher than said first coercivity less than approximately 200 oersteds.

2. Apparatus for reading magnetic records as claimed in claim 1, wherein:
   said electrical signal is derived from a voltage across said inductive read head.

3. Apparatus for reading magnetic records as claimed in claim 2, wherein:
   said voltage across said inductive read head is detected by a differential integrator, said differential integrator being adapted to integrate over time a difference between respective voltages of each side of said inductive read head.

4. Apparatus for reading magnetic records as claimed in claim 1, wherein:
   said range of frequencies of interest is below a frequency of oscillation of said oscillator.

5. Apparatus for reading magnetic records as claimed in claim 1, wherein:
   said range of frequencies of interest is below 10 kHz.

6. Apparatus for reading magnetic records as claimed in claim 1, wherein:
   said impedance seen by said at least one side of said inductive read head is at least three times larger than said impedance of said inductive read head over said range of frequencies of interest.

7. Apparatus for reading magnetic records as claimed in claim 1, wherein:
   said magnetic record having said second coercivity is erasable.

* * * * *